United States Patent Office 3,400,088
Patented Sept. 3, 1968

3,400,088
POLYVINYL CHLORIDE STABILIZED WITH MIX-
TURES OF A PCl₃-BIS PHENOL REACTION PROD-
UCT, EPOXY RESIN AND HEAVY METAL SALT
Yolande Bourgau, Neuville, and Jacques Fritz, Lyon,
France, assignors to Societe Progil, Paris, France
No Drawing. Filed Feb. 9, 1965, Ser. No. 431,456
Claims priority, application France, Feb. 10, 1964,
963,164
7 Claims. (Cl. 260—23)

ABSTRACT OF THE DISCLOSURE

Stabilizer additive for polyvinyl chloride resin, comprising the substance obtained by reacting one mole of phosphorus trichloride with two to four moles of 4,4'-dihydroxydiphenyl-dimethyl-methane, an epoxy resin and heavy metal salts, and process for preparation of the said stabilizer.

---

The present invention relates to a new stabiliser for plastic compositions, serving particularly for stabilising polyvinyl resins against heat and/or light. It also has for its object the resinous compositions, particularly polyvinyl chlorides, stabilised in this way.

It is known that the addition of certain organic phosphites to polyvinyl resins exerts, by chelation, a stabilising action on these resins, when they are used in conjunction with epoxy resins and salts of fatty acids of heavy metals, as for example the laurates, stearates and ricinoleates of cadmium, barium or lead.

Among the phosphites described for this purpose, there may be particularly mentioned the trialkyl phosphites, namely, trimethyl and tridecyl phosphites; acid phosphites of dialkyls, such as dioctyl or dilauryl; triaryl phosphites, particularly phenyl or cresyl phosphites; monoalkyl or dialkyl and diphenyl or monophenyl phosphites, as well as hydroxyaryl phosphites.

One of the best stabilisers among the already known class of organic phosphites is tri-(p-tert.butylphenyl) phosphite.

According to the present invention, the stabilising power of the epoxy resins and of the heavy metal salts is distinctly improved when these additives have incorporated therein, instead of the conventional hydrocarbon phosphites, phosphorus-containing hydroxyaryl compounds obtained by the action of one mol of phosphorus trihalide (particularly PCl₃) on at least two mols of a diphenol of the formula:

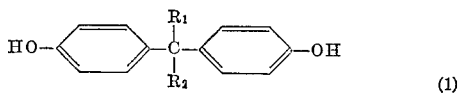

(1)

in which R₁ and R₂ may be like or different and represent a hydrogen atom or a lower alkyl radical.

These compounds are characterised in that they contain phosphorus bonded to the aromatic rings by means of oxygen bridges, and that these rings carry free phenolic OH groups.

Stabilisers according to the invention which are particularly suitable for the stabilisation of vinyl resins are the phosphorus derivatives of Bisphenol A, that is to say, of the diphenol (1) in which R₁ and R₂ are CH₃ radicals; these derivatives are formed by the action of PCl₃ under heat of at least 2 mols of dihydroxy-4,4'-diphenyl-dimethylmethane, followed by the removal of the HCl thus produced.

The preparation of such hydroxyaryl compounds containing phosphorus can be carried out by starting with up to 4 mols and preferably 2 to 4 mols of a diphenol. It may be effected by heating the reagents in an inert solvent or in the presence of an organic base.

However, according to the present invention, it is particularly advantageous to prepare the new stabilisers by the progressive introduction of phosphorus trichloride into molten Bisphenol A, kept at a temperature of 80° to 160° C., and subsequently eliminating the HCl which has formed, by heating under atmospheric or reduced pressure.

One first practical method of operation consists in heating the Bishpenol A to a temperature higher than its melting point, for example to between 150° and 160° C., then progressively introducing the phosphorus trichloride into the molten product which has been cooled to 80 to 100° C. The reaction is completed by heating to the region of 120° to 140° C. under atmospheric pressure, or even to 70° to 80° C. under a pressure of 30 to 50 mm. Hg, until the HCl formed is completely eliminated. The compounds thus obtained are solids of resinous appearance and yellowish in colour, in which the percentage of phosphorus varies between wide limits, for example, between 3 and 8%.

The reaction with PCl₃ can be completed more quickly, namely in about 20 to 30 minutes, if the introduction of phosphorus trichloride is commenced while the bishpenol is in the region of 150° C.; while introducing the reagent, the temperature is allowed to fall so that it is in the region of 90° to 110° C. after completing the introduction thereof. The operation is then completed by heating for 1 to 3 hours to the region of 140° to 150° C. for eliminating the hydrochloric acid which has formed. These operations, conducted at higher temperatures than in the first embodiment referred to above, yield an excellent stabiliser. Furthermore, this procedure avoids any possible drawbacks due to the supercooling of bisphenol; it also allows one to use more than 3 moles of bisphenol per mole of PCl₃ without difficulties which otherwise could arise because of the strong viscosity of the medium.

According to a preferred characteristic of the invention the reaction between phosphorus trihalide and hydroxyaryl is carried out in carbon dioxide atmosphere; less coloured products are thus obtained.

It can be assumed that the resinous solids which constitute the phosphorus-containing hydroxyaryl compounds obtained according to the invention, as described above, comprise hydroxyaryl phosphites; however, the constitution thereof is still not well established and it appears to be fairly complex. In any case, these compounds differ from known phosphites, especially from those which are obtained by transesterification of a dialkyl, trialkyl or aryl phosphite with a phenol or a polyphenol. Thus, clear differences appear between the chromatographic strips recorded on the hand with the compounds obtained by the action of phosphorus trichloride on Bisphenol A, as indicated above, and on the other hand the tri[bis-(p-hydroxyphenyl)] propane phosphite prepared by the conventional method of transesterification, namely, by heating Bisphenol A with triphenyl phosphite.

Furthermore, the behaviour in the stabilisation of plastic compositions of phosphorous compounds according to the invention is very different form that of the corresponding phosphites prepared by transesterification; the said compounds are found to be better stabilisers than the phosphites obtained by transesterification from the same phenols.

The incorporation of the phosphorous compounds according to the invention into vinyl polymers, particularly polyvinyl chloride, takes place by known methods, for example by suitably plasticised resin in powder form being mixed on an external mixer with an epoxy resin, one or more organic salts of heavy metals, and a certain proportion of said phosphorous compounds according to the invention.

The proportions of these compounds added to the polyvinyl chloride resin may vary within wide limits; nevertheless, quantities of 0.1 to 1% of the weight of resin or 2 to 20% of the total weight of the costabilisers, preferably 2 to 10%, are particularly suitable. The total of the three stabilisers is preferably between 1 and 5% of the weight of the resin to be stabilised.

For carrying out the heat stability test in respect of each composition, the specimens were placed in an oven at 177° C., and then the colouring therof was examined as a function of time. The results obtained are set out in the following table, where the comparison specimen has the composition corresponding to the formula indicated above, but does not contain any phosphite or phosphorous compound.

| Time (min.) | Colourings | | | | | | | |
|---|---|---|---|---|---|---|---|---|
| | Comparison | A | B | C | D | E | F | G |
| 30 | Colourless | Colourless | Colourless | Colourless | Colourless | Colourless | Colourless | Colourless. |
| 60 | Pale yellow | do | do | do | do | do | do | Do. |
| 80 | Light orange | do | do | do | do | do | do | Do. |
| 100 | Deep orange | do | do | do | do | do | do | Do. |
| 120 | Brown | Very lt. yellow | Very lt. yellow | Very lt. yellow | Very lt. yellow | Very lt. yellow | Very lt. yellow | Light yellow. |
| 140 | Black | do | do | do | do | do | do | Do. |
| 160 | | Light yellow | Light yellow | Light yellow | Light yellow | Fast yellow | Light yellow | Do. |
| 180 | | do | do | do | do | Orange-brown | Deep yellow | Orange yellow. |
| 210 | | do | do | do | do | Black | Orange-brown | Orange-brown. |
| 240 | | do | do | do | Orange-yellow | | Black | Black. |
| 270 | | Orange | Orange | Brown | Brown | | | |
| 290 | | do | do | do | do | | | |

The following examples are given in nonlimiting manner and show how the invention may be carried into effect. They illustrate the beneficial effect of the phosphorous compounds derived from Bisphenol A on the heat stabilisation and light stabilisation of plasticised polyvinyl chloride, and show clearly the superiority of these stabilisers over the phosphites normally used commercially.

Example 1

Compounds containing phosphorous are prepared from dihydroxy-4,4'-diphenyldimethylmethane (Bisphenol A) by progressive addition of 1 mol of $PCl_3$ at a temperature from 80° to 100° C. to quantities of molten Bisphenol A which vary between 2 and 3.5 mols, and then heating in vacuo (about 40 mm. Hg) at 70° to 80° C. Solids of resinous appearance and yellowish in colour are obtained, and the phosphorous contents by weight thereof vary from 3.0 to 7.60%.

A series of compositions is then prepared by introducing each of these compounds, using an external mixer, into a polyvinyl chloride plasticised with dioctyl phthalate, in which conventional costabilisers are likewise incorporated. By way of comparison, similar compositions have been prepared, in which the compounds according to the invention were replaced by phosphites known as stabilisers. A typical formula is set out in the following table.

Ingredients: Parts by weight
  Polyvinyl chloride in powder form _____ 100
  Dioctyl phthalate _____ 50
  Epoxy resin (Epikote 834) _____ 1
  Ba and Cd laurate (Ba/Cd=2) _____ 1.5
  Phosphorous compound, or phosphite _____ 0.278

The various compounds used were:
Composition A.—Phosphorous compound prepared from $PCl_3$ and Bisphenol A, containing 3.73% of P,
Composition B.—Phosphorous compound prepared from $PCl_3$ and Bisphenol A, containing 4.80% of P,
Composition C.—Phosphorous compound prepared from $PCl_3$ and Bisphenol A, containing 5.49% of P,
Composition D.—Phosphorous compound prepared from $PCl_3$ and Bisphenol A, containing 5.66% of P,
Composition E.—Triphenyl phosphite,
Composition F.—p-Tert.butylphenol phosphite,
Composition G.—Tri-[bis-(p-hydroxyphenyl)] propane phosphite, prepared by transesterification between 3 mols of Bisphenol A and 1 mol of triphenyl phosphite, according to French Patent No. 1,347,282.

The sheets removed from the external mixer and obtained from each composition were pressed for 1 minute at 175° C. in order to obtain sheets with a thickness of 1.8 mm., from which specimens of the dimensions 3 x 7 cm. were cut.

The results obtained clearly show the excellent behaviour under heat of the compositions A to D containing phosphorus compounds according to the invention. Whereas the specimens containing triphenylphosphite, normally used commercially, are already black after 210 minutes at 177° C., and those which contain p-tert.butylphenol phosphite (one of the best known stabilisers) assume the same shade after 240 minutes, the compositions according to the invention still remain capable of use for several tens of minutes and only become black after 310 minutes.

Example 2

A series of stability tests with respect to ultraviolet rays of the compositions A to D according to the invention, the compositions E, F and G containing known organic phosphites and also of the comparison mixture free from phosphorus was carried out: the apparatus used was that which French Rubber Institute has developed and standardised for such measurements.

Specimens with the dimensions 70 x 30 mm., cut from sheets with a thickness of 1.8 mm., obtained as indicated in Example 1, are arranged at 15 cm. from a series of 3 high-pressure ultra-violet lamps with a power per unit of 125 watts. The temperature of the specimens is kept below 60° C. by a fan. After exposure for 5 to 8 hours under the conditions indicated above, it was found that the test specimen of the comparison composition had assumed a yellowish orange colour and that the test specimens of formulae E, F and G had become yellowish. The specimens corresponding to the compositions A to D, on the other hand, had remained practically colourless.

Example 3

685 g. of Bisphenol A (3 mols) are melted and brought to 155° C.; 138 g. of phosphorus trichloride (1 mol) are progressively added thereto in 25 minutes while stirring and while allowing the reaction mixture to cool slowly. On completing the introduction of the $PCl_3$, this liquid mixture is at 102° C.; it is then heated to 145° C. and kept at this temperature for 1¼ hours, until all release of hydrochloric acid has ceased. After cooling to normal temperature, the solid, resinous and yellowish composition obtained had a content of 4.6% by weight of phosphorus.

This composition, tested as stabilisation adjuvant for polyvinyl chloride, in the manner described in Example 1, gives the same results as composition B.

Example 4

The preparation according to the first paragraph of Example 1 is repeated, while during the reaction a carbon dioxide atmosphere is maintained above the reaction medium within the vessel within which the operation is carried out. The resinous solids thus obtained are less coloured than the ones which were prepared in Example 1.

Example 5

In a preparation identical with that of Example 3, an atmosphere of $CO_2$ has been continuously maintained above the reaction medium. The product which resulted from this operation was clearer than that of Example 3.

We claim:

1. Stabiliser additive for polyvinyl chloride resin which is a mixture of an epoxy resin, a heavy metal salt of an organic acid and at least 2% of the weight of said additive of an hydroxy-aryl compound containing combined phosphorus, which is obtained by reacting 1 mole of phosphorus trichloride with 2 to 4 moles of 4,4'-dihydroxy-diphenyl-dimethyl-methane at 80 to 160° C.—the final temperature being 80 to 110° C., and then heating from 110° C. to 50° C. until the hydrochloric acid formed is eliminated, the obtained product containing 3 to 8% by weight of combined phosphorus, and free phenolic OH groups, and being substantially free of chlorine atoms.

2. Stabilizer additive according to claim 1 in which the reaction between phosphorus trichloride and 4,4'-dihydroxy-diphenyl-dimethyl-methane is carried out at a tempeature of 80 to 120° C. during 20 to 40 minutes.

3. Stabilizer additive according to claim 1, which contains by weight 10 to 60% of an epoxy resin, 20 to 90% of an organic salt of heavy metal and 2 to 20% of said phosphorus derivative.

4. Stabilizer additive in accordance with claim 3 wherein said organic salt of heavy metal comprises cadmium laurate and barium laurate.

5. A stabilizer additive for polyvinyl chloride comprising the reaction product of 1 mole of $PCl_3$ with 2–4 moles of

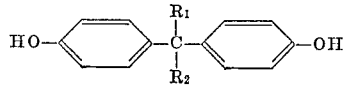

wherein $R_1$ and $R_2$ are hydrogen or lower alkyls, said reaction being carried out at an initial temperature of 80–160° C. and a final temperature of 80–110° C., said reaction being followed by heating to 110–150° C. until the formed HCl has been eliminated, said reaction product containing free phenolic OH groups and 3–8% by weight of combined phosphorus and being substantially free of chlorine atoms.

6. A stabilizer in accordance with claim 5 wherein $R_1$ and $R_2$ are hydrogen.

7. A composition of matter comprising polyvinyl chloride resin and 1 to 5% by weight of the resin of the stabilizer additive of claim 1.

References Cited

UNITED STATES PATENTS

| | | | |
|---|---|---|---|
| 2,625,521 | 1/1953 | Fischer et al. | 260—23 |
| 2,997,454 | 8/1961 | Leistner et al. | 260—45.8 |
| 3,112,286 | 11/1963 | Morris et al. | 260—29.7 |
| 3,192,243 | 6/1965 | Gagliani | 260—976 |
| 3,225,001 | 12/1965 | Darsa | 260—45.75 |

DONALD E. CZAJA, *Primary Examiner.*

R. A. WHITE, *Assistant Examiner.*